US012700176B2

(12) United States Patent
Chen et al.

(10) Patent No.: US 12,700,176 B2
(45) Date of Patent: Aug. 4, 2026

(54) THREE-DIMENSIONAL HUMAN HEAD RECONSTRUCTION METHOD, ELECTRONIC DEVICE AND NON-TRANSIENT COMPUTER-READABLE STORAGE MEDIUM

(71) Applicant: Beijing Zitiao Network Technology Co., Ltd., Beijing (CN)

(72) Inventors: Zhixing Chen, Beijing (CN); Qili Deng, Beijing (CN); Zhichao Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 138 days.

(21) Appl. No.: 18/688,212

(22) PCT Filed: Aug. 31, 2022

(86) PCT No.: PCT/CN2022/116162
§ 371 (c)(1),
(2) Date: Feb. 29, 2024

(87) PCT Pub. No.: WO2023/030381
PCT Pub. Date: Mar. 9, 2023

(65) Prior Publication Data
US 2025/0131648 A1 Apr. 24, 2025

(30) Foreign Application Priority Data
Sep. 1, 2021 (CN) .......................... 202111022097.2

(51) Int. Cl.
*G06T 17/00* (2006.01)
(52) U.S. Cl.
CPC .................................... *G06T 17/00* (2013.01)
(58) Field of Classification Search
None
See application file for complete search history.

(56) References Cited

FOREIGN PATENT DOCUMENTS

| | | |
|---|---|---|
| CN | 102663820 A | 9/2012 |
| CN | 103024336 A | 4/2013 |

(Continued)

OTHER PUBLICATIONS

He et al.; "Data-driven 3D human head reconstruction," 2019' Computers & Graphics, vol. 80, pp. 85-96 (Year: 2019).*

(Continued)

*Primary Examiner* — Peter Hoang
(74) *Attorney, Agent, or Firm* — BakerHostetler

(57) ABSTRACT

A three-dimensional human head reconstruction method, an electronic device and a non-transient computer-readable storage medium are provided. The method includes: acquiring a target portrait image; inputting the target portrait image into a target model to obtain an output result of the target model; wherein the target model is obtained by pre-training with a plurality of training samples which are generated according to a sample portrait image and a sample three-dimensional human head model, the sample three-dimensional human head model is obtained by iteratively fitting a standard three-dimensional human face statistical model according to two-dimensional feature information related to a portrait in the sample portrait image, and the two-dimensional feature information includes human face feature points and a human head projection contour line; and generating, according to the output result, a target three-dimensional human head model corresponding to the target portrait image.

20 Claims, 3 Drawing Sheets

Acquiring a target portrait image ———— S110

Inputting the target portrait image into a target model to obtain an output result of the target model; wherein the target model is obtained by pre-training with a plurality of training samples which are generated according to a sample portrait image and a sample three-dimensional human head model, the sample three-dimensional human head model is obtained by iteratively fitting a standard three-dimensional human face statistical model according to two-dimensional feature information related to a portrait in the sample portrait image, the two-dimensional feature information includes human face feature points and a human head projection contour line ———— S120

Generating, according to the output result, a target three-dimensional human head model corresponding to the target portrait image ———— S130

(56) References Cited

FOREIGN PATENT DOCUMENTS

| | | | |
|---|---|---|---|
| CN | 103116902 A | 5/2013 |
| CN | 104299264 A | 1/2015 |
| CN | 106652025 A | 5/2017 |
| CN | 108510437 A | 9/2018 |
| CN | 109255830 A | 1/2019 |
| CN | 110288716 A | 9/2019 |
| CN | 111784821 A | 10/2020 |
| CN | 112669447 A | 4/2021 |
| CN | 112884889 A | 6/2021 |
| CN | 113095149 A | 7/2021 |
| CN | 113129425 A | 7/2021 |
| CN | 113132815 A | 7/2021 |
| EP | 3657440 A1 | 5/2020 |
| WO | WO 2020/263541 A1 | 12/2020 |

OTHER PUBLICATIONS

Li et al. "Learning a model of facial shape and expression from 4D scans;" 2017; ACM Trans. Graph. 36.6 (2017): pp. 1-17 (Year: 2017).*

International Patent Application No. PCT/CN2022/116162; Int'l Search Report; dated Nov. 25, 2022; 2 pages.

China Patent Application No. 202111022097.2; Office Action; dated Dec. 17, 2025; 27 pages.

Ge Zhiyong; "3D Reconstruction of Human Head Based on Multi-View Vision"; Nanjing University of Science & Technology; Master's Dissertations; Dec. 2017; 67 pages (English Abstract on p. II).

Yan Yousan; "Face image processing for deep learning—Core algorithm and case actual combat"; Chapter 10 Face 3D Reconstruction; Q Machinery Industry Press; Jul. 2020; p. 294-298.

China Patent Application No. 202111022097.2; Second Office Action; dated May 9, 2026; 20 pages.

Ning Zhenwei et al.; "Three-dimensional modeling technology and practice of digital city Technology and Practice of 3D City Modeling"; Surveying and Mapping Publishing House; Dec. 2013; p. 59-62.

* cited by examiner

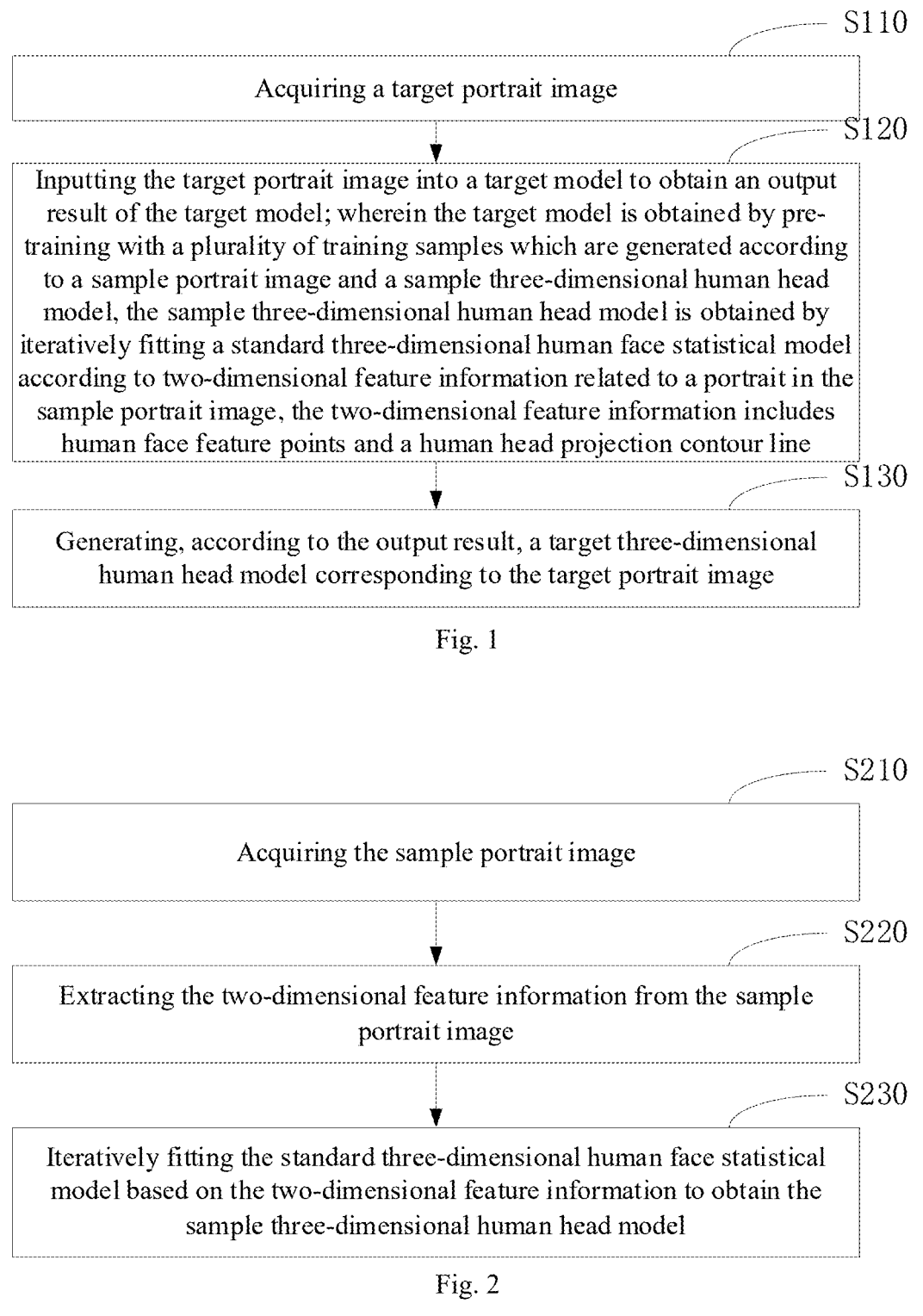

S110

Acquiring a target portrait image

S120

Inputting the target portrait image into a target model to obtain an output result of the target model; wherein the target model is obtained by pre-training with a plurality of training samples which are generated according to a sample portrait image and a sample three-dimensional human head model, the sample three-dimensional human head model is obtained by iteratively fitting a standard three-dimensional human face statistical model according to two-dimensional feature information related to a portrait in the sample portrait image, the two-dimensional feature information includes human face feature points and a human head projection contour line

S130

Generating, according to the output result, a target three-dimensional human head model corresponding to the target portrait image

Acquiring the sample portrait image

S220

Extracting the two-dimensional feature information from the sample portrait image

S230

Iteratively fitting the standard three-dimensional human face statistical model based on the two-dimensional feature information to obtain the sample three-dimensional human head model

Fig. 2

THREE-DIMENSIONAL HUMAN HEAD RECONSTRUCTION METHOD, ELECTRONIC DEVICE AND NON-TRANSIENT COMPUTER-READABLE STORAGE MEDIUM

CROSS-REFERENCE TO RELATED APPLICATION

The present application is the U.S. National Stage of International Application No. PCT/CN2022/116162, filed on Aug. 31, 2022, which claims the priority of Chinese patent application No. 202111022097.2 titled "THREE-DIMENSIONAL HUMAN HEAD RECONSTRUCTION METHOD AND APPARATUS, AND DEVICE AND MEDIUM" filed on Sep. 1, 2021, which are incorporated into the present application by reference in their entireties.

TECHNICAL FIELD

The present disclosure relates to the technical field of image processing, and particularly to a three-dimensional human head reconstruction method, apparatus, device and medium.

BACKGROUND

With the popularization of video applications and portrait beautification applications, various functions of portrait special effects have also been widely applied, three-dimensional reconstruction, which is an effective technology of portrait expression, has been widely applied in functions of portrait special effects. For example, some portrait special effects can be added only after deformation of the portrait, and the deformation of the portrait often needs to be carried out on a three-dimensional model for portrait reconstruction.

However, current three-dimensional reconstruction methods can only realize three-dimensional reconstruction of the human face of a portrait, but cannot realize three-dimensional reconstruction of the human head of the portrait. Therefore, it is impossible to add special effects to the human head of the portrait by utilizing the current three-dimensional reconstruction methods.

SUMMARY

In order to solve or at least partially solve the above technical problem, the present disclosure provides a method, an apparatus, a device and a medium for three-dimensional human head reconstruction.

In a first aspect, the present disclosure provides a three-dimensional human head reconstruction method, comprising:

acquiring a target portrait image;

inputting the target portrait image into a target model to obtain an output result of the target model; wherein the target model is obtained by pre-training with a plurality of training samples which are generated according to a sample portrait image and a sample three-dimensional human head model, the sample three-dimensional human head model is obtained by iteratively fitting a standard three-dimensional human face statistical model according to two-dimensional feature information related to the portrait in the sample portrait image, and the two-dimensional feature information includes human face feature points and a human head projection contour line;

generating, according to the output result, a target three-dimensional human head model corresponding to the target portrait image.

In a second aspect, the present disclosure provides a three-dimensional human head reconstruction apparatus, comprising:

a first acquisition unit, configured to acquire a target portrait image;

a first processing unit, configured to input the target portrait image into a target model to obtain an output result of the target model; wherein the target model is obtained by pre-training with a plurality of training samples which are generated according to a sample portrait image and a sample three-dimensional human head model, the sample three-dimensional human head model is obtained by iteratively fitting a standard three-dimensional human face statistical model according to two-dimensional feature information related to the portrait in the sample portrait image, and the two-dimensional feature information includes human face feature points and a human head projection contour line;

a first generation unit, configured to generate, according to the output result, a target three-dimensional human head model corresponding to the target portrait image.

In a third aspect, the present disclosure provides a three-dimensional human head reconstruction device, comprising:

a processor;

a memory for storing executable instructions;

wherein the processor is used for reading the executable instructions from the memory and executing the executable instructions to implement the three-dimensional human head reconstruction method according to the first aspect.

In a fourth aspect, the present disclosure provides a computer-readable storage medium storing computer programs which, when executed by a processor, cause the processor to implement the three-dimensional human head reconstruction method according to the first aspect.

Compared with the prior art, the technical schemes provided by the embodiments of the present disclosure have the following advantages.

The method, apparatus, device and medium for three-dimensional human head reconstruction of the embodiments of the present disclosure can acquire a target portrait image, and input the target portrait image into a pre-trained target model to obtain an output result of the target model, so as to generate a target three-dimensional human head model corresponding to the target portrait image according to the output result. Since the three-dimensional human head model for generating the training samples of the target model is obtained by iteratively fitting a standard three-dimensional human face statistical model according to two-dimensional feature information related to a portrait in a sample portrait image, and the two-dimensional feature information for the iterative fitting includes human face feature points and a human head contour line, so as to enable the three-dimensional human head model for generating the training samples of the target model to express human face features and human head contour features of the portrait in the sample portrait image, and further enable the target model obtained by training based on the training samples to be used to detect information related to the human face features and human head contour features of the portrait, the output result of the target model for the target portrait image can be used to express information related to the human face features and human head contour features of the portrait in the target portrait image, so that the target three-dimensional human head model which can express both the human face features and the human head contour features can be generated according to the output result, and the target three-dimensional human head model can be used to add special effects to the human head of the portrait.

BRIEF DESCRIPTION OF DRAWINGS

The above and other features, advantages and aspects of the embodiments of the present disclosure will become more apparent by referring to the following detailed description when taken in conjunction with the accompanying drawings. Throughout the drawings, the same or similar reference numerals indicate the same or similar elements. It shall be understood that the drawings are schematic, and the original and elements are not necessarily drawn to scale.

FIG. 1 is a schematic flowchart of a three-dimensional human head reconstruction method provided by an embodiment of the present disclosure;

FIG. 2 is a schematic flowchart of another three-dimensional human head reconstruction method provided by an embodiment of the present disclosure;

DETAILED DESCRIPTION

Figure 3:
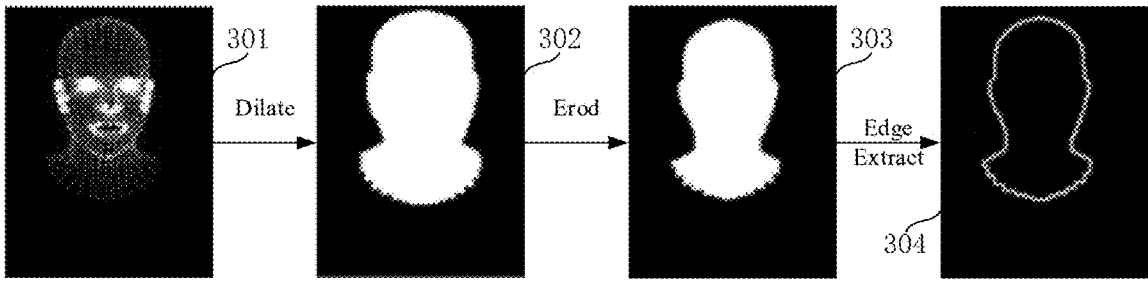
FIG. 3 is a flowchart of extraction of a portrait projection contour line provided by an embodiment of the present disclosure.

The embodiments of the present disclosure will be described in more detail below with reference to the accompanying drawings. Although certain embodiments of the present disclosure are shown in the accompanying drawings, it should be understood that the present disclosure can be implemented in various forms and should not be construed as limited to the embodiments set forth herein, but rather, these embodiments are provided for a more thorough and complete understanding of the present disclosure. It should be understood that the accompanying drawings and embodiments of the present disclosure are only used for illustrative purposes, and are not used to limit the protection scope of the present disclosure.

It should be understood that various steps described in the method implementation of the present disclosure may be performed in a different order and/or in parallel. Furthermore, the method implementation may include additional steps and/or omit execution of the illustrated steps. The scope of the present disclosure is not limited in this respect.

As used herein, the term "including" and its variants are openly including, that is, "including but not limited to". The term "based on" is "at least partially based on". The term "an embodiment" means "at least one embodiment"; the term "another embodiment" means "at least one further embodiment"; and the term "some embodiments" means "at least some embodiments". The related definitions of other terms will be given in the following description.

It should be noted that the concepts of "first", "second", and so on mentioned in the present disclosure are only used to distinguish different apparatuses, modules or units, and are not used to limit the order or interdependency of the functions performed by these apparatuses, modules or units.

It should be noted that the modifications of "one" and "multiple" mentioned in the present disclosure are schematic rather than limiting, and those skilled in the art should understand that unless the context clearly indicates otherwise, they should be understood as "one or more".

The names of the messages or information exchanged among multiple apparatuses in the embodiments of the present disclosure are only used for illustrative purposes, and are not used to limit the scope of these messages or information.

The embodiments of the present disclosure provide a three-dimensional human head reconstruction method, an apparatus, a device and a medium capable of three-dimensional reconstruction of a human head in a portrait image.

Firstly, a three-dimensional human head reconstruction method provided by the embodiments of the present disclosure will be described with reference to FIGS. 1 to 4.

In the embodiments of the present disclosure, the three-dimensional human head reconstruction method may be performed by a three-dimensional human head reconstruction device, which may be an electronic device or a server, which is not limited here. The electronic device may include devices with communication functions, such as mobile phones, tablet computers, desktop computers, notebook computers, vehicle-mounted terminals, wearable electronic devices, all-in-one machines, smart home devices and so on, or may also be devices simulated by virtual machines or simulators. The servers may include devices with storage and computing functions, such as cloud servers or server clusters.

FIG. 1 shows a schematic flowchart of a three-dimensional human head reconstruction method provided by an embodiment of the present disclosure.

As shown in FIG. 1, the three-dimensional human head reconstruction method may comprise the following steps.

S110: acquiring a target portrait image.

In the embodiment of the present disclosure, a three-dimensional human head reconstruction device may acquire a target portrait image for which a three-dimensional reconstruction of a human head is needed, and the target portrait image may be a two-dimensional image.

In some embodiments, the three-dimensional human head reconstruction device may shoot an image in real time and take the image as the target portrait image.

In some other embodiments, the three-dimensional human head reconstruction device may also acquire an image selected locally by a user and take the image as the target portrait image.

In yet some other embodiments, the three-dimensional human head reconstruction device may receive an image sent by another device and take the image as the target portrait image.

In still some other embodiments, the three-dimensional human head reconstruction device may extract any image from a local image library and take the image as the target portrait image.

S120: inputting the target portrait image into a target model to obtain an output result of the target model; the target model is obtained by pre-training with a plurality of training samples which are generated according to a sample portrait image and a sample three-dimensional human head model, the sample three-dimensional human head model is obtained by iteratively fitting a standard three-dimensional human face statistical model according to two-dimensional feature information related to a portrait in the sample portrait image, and the two-dimensional feature information includes human face feature points and a human head projection contour line.

In the embodiment of the present disclosure, the three-dimensional human head reconstruction device may, after acquiring the target portrait image, input the target portrait image into a pre-trained target model, so as to extract information related to three-dimensional reconstruction of a human head in the target model and obtain the output result of the target model.

The human face feature points may be used to represent human face features of the portrait in the sample portrait image, and the human head contour line may be used to represent human head contour features of the portrait in the sample portrait image.

Optionally, the standard three-dimensional human face statistical model may include a standard human head three-dimensional Morphable Model (3DMM).

In the embodiment of the present disclosure, further, the two-dimensional feature information may further include shoulder feature points. The shoulder feature points may be used to represent neck posture features of the portrait in the sample portrait image.

S130: generating, according to the output result, a target three-dimensional human head model corresponding to the target portrait image.

In the embodiment of the present disclosure, the three-dimensional human head reconstruction device may, after acquiring the output result, generate the target three-dimensional human head model corresponding to the target portrait image according to the output result in a preset way of generating a human head model.

The embodiment of the present disclosure can acquire a target portrait image, and input the target portrait image into a pre-trained target model to obtain an output result of the target model, so as to generate a target three-dimensional human head model corresponding to the target portrait image according to the output result. Since the three-dimensional human head model for generating the training samples of the target model is obtained by iteratively fitting a standard three-dimensional human face statistical model according to two-dimensional feature information related to a portrait in a sample portrait image, and the two-dimensional feature information for iterative fitting includes human face feature points and a human head contour line, so as to enable the three-dimensional human head model for generating the training samples of the target model to express human face features and human head contour features of the portrait in the sample portrait image, and further enable the target model obtained by training based on the training samples to be used to detect information related to the human face features and human head contour features of the portrait, the output result of the target model for the target portrait image can be used to express information related to the human face features and human head contour features of the portrait in the target portrait image, so that the target three-dimensional human head model which can express both the human face features and the human head contour features can be generated according to the output result, and the target three-dimensional human head model can be used to add special effects to the human head of the portrait.

In another embodiment of the present disclosure, in order to improve efficiency of three-dimensional human head reconstruction, the training samples may include the sample portrait image and sample statistical model parameters corresponding to the sample three-dimensional human head model.

The sample statistical model parameters are model parameters for characterizing human head features of portrait that are extracted from the sample three-dimensional human head model, and are also model parameters in the sample three-dimensional human head model with different numerical values from those in the standard three-dimensional human face statistical model.

Optionally, the model parameters may include an identity coefficient of the portrait in the image, an expression coefficient of the portrait in the image, a posture coefficient of the portrait in the image, a selection coefficient of the portrait in the image, a translation coefficient of the portrait in the image, and projection parameters of a capturing device capturing an image. The projection parameters may be off-camera parameters of the capturing device.

Therefore, in the embodiment of the present disclosure, the target model for extracting model parameters related to three-dimensional reconstruction of a human head from the portrait image can be trained utilizing the above training samples.

In the embodiment of the present disclosure, after the three-dimensional human head reconstruction device receives the target portrait image, it may input the target portrait image into the target model trained based on the above samples to obtain the output result of the target model.

The output result may include target statistical model parameters. The target statistical model parameters may be model parameters related to three-dimensional reconstruction of a human head.

Therefore, in the embodiment of the present disclosure, quick extraction of the target statistical model parameters corresponding to the target portrait image can be realized through the target model.

In some embodiments of the present disclosure, before S110, the three-dimensional human head reconstruction method may further comprise:

acquiring the plurality of training samples;

learning a mapping relationship between the sample portrait image and the sample statistical model parameters in each of the training samples through a first regression loss function, to obtain the target model.

In the embodiment of the present disclosure, before the acquiring a target portrait image, the three-dimensional human head reconstruction device may first acquire the plurality of training samples and train the target model utilizing the plurality of training samples.

Specifically, the three-dimensional human head reconstruction device may acquire the plurality of training samples by the steps of: first obtaining a standard three-dimensional human face statistical model by scanning a plurality of pre-built three-dimensional human head models and by a Principal Components Analysis (PCA) method; then obtaining a plurality of sample portrait images, and extracting two-dimensional feature information related to a portrait in each of the sample portrait images; then obtaining sample three-dimensional human head models corresponding to each of the sample portrait images by iteratively fitting the standard three-dimensional human face statistical model according to each piece of the two-dimensional feature information; and then extracting sample statistical model parameters from each of the sample three-dimensional human head models, and taking each of the sample portrait images and the sample statistical model parameters corresponding to the sample portrait image as a training sample.

Next, the three-dimensional human head reconstruction device may directly utilize the first regression loss function, and regress the sample statistical model parameters corresponding to each of the sample portrait images through a solution optimization algorithm such as gradient descent or Gauss-Newton method, to obtain the target model.

Optionally, the first regression loss function may be a Smooth-L1 loss function.

Therefore, in the embodiment of the present disclosure, a large number of labeled data can be automatically collected through the above described method of generating the sample three-dimensional human head model corresponding to the sample portrait image, thereby reducing the cost for collecting the training samples.

Further, the three-dimensional human head reconstruction device may acquire a plurality of preset portrait images with different human face angles and different expressions, in which each of the preset portrait images includes a portrait human head and a portrait shoulder. For example, the three-dimensional human head reconstruction device may acquire 100,000-300,000 preset portrait images. Then, the three-dimensional human head reconstruction device may perform processing such as rotating and translating on respective preset portrait images, respectively, to realize augmentation of image data. Finally, the three-dimensional human head reconstruction device may take the augmented portrait image as the sample portrait image.

Therefore, in the embodiment of the present disclosure, quick training of the target model for extracting statistical model parameters from portrait images can be realized.

In some other embodiments of the present disclosure, after the acquiring a model parameter detection model, the three-dimensional human head reconstruction method may further comprise:

continuing to learn the mapping relationship between the sample portrait image and the sample statistical model parameters in each of the training samples through a target loss function, to obtain an optimized target model.

In the embodiment of the present disclosure, after the target model is trained utilizing the first regression loss function, the mapping relationship between the sample portrait image and the sample statistical model parameters in each of the training samples may be further continued to be learned utilizing the target loss function through a solution optimization algorithm such as a gradient descent or Gauss-Newton method, so as to model-optimize the target model to obtain an optimized target model.

The target loss function may include a second regression loss function and a projection loss function, and the weight values of identity coefficients in the second regression loss function are greater than the weight values of identity coefficients in the first regression loss function.

Optionally, the second regression loss function may also be a Smooth-L1 loss function. However, the weight values of the identity coefficient in the second regression loss function may be set to be greater than the weight values of the identity coefficient in the first regression loss function, so that the human head shape and the five sense organ shapes can be trained emphatically to model-optimize the target model.

Further, the weight values of the human head shape coefficient, the eye shape coefficient and the mouth shape coefficient in the identity coefficients in the second regression loss function may be set to be greater than the weight values of the human head shape coefficient, the eye shape coefficient and the mouth shape coefficient in the identity coefficients in the first regression loss function, so that the human head shape, the eye shape and the mouth shape for obviously distinguishing portrait features can be trained emphatically to model-optimize the target model.

Therefore, in the embodiment of the present disclosure, the projection loss, the human head shape and the five sense organ shapes can be optimized, thereby improving the reliability of the detection result of the model parameter detection model.

In yet some other embodiments of the present disclosure, S130 may specifically comprise generating a target three-dimensional human head model according to the target statistical model parameters and the standard three-dimensional human face statistical model.

In the embodiment of the present disclosure, after extracting the target statistical model parameters, the three-dimensional human head reconstruction device may replace the standard statistical model parameters in the standard three-dimensional human face statistical model with the target statistical model parameters, generate the target three-dimensional human head model corresponding to the target portrait image, so as to efficiently generate the target three-dimensional human head model.

In another embodiment of the present disclosure, in order to improve the efficiency of three-dimensional reconstruction of a human head in a portrait image, there is provided another three-dimensional human head reconstruction method, which will be described below with reference to FIG. 2.

FIG. 2 shows a schematic flowchart of another three-dimensional human head reconstruction method provided by an embodiment of the present disclosure.

As shown in FIG. 2, before S110 shown in FIG. 1, the three-dimensional human head reconstruction method may further comprise the following steps.

S210: acquiring the sample portrait image.

In the embodiment of the present disclosure, the three-dimensional human head reconstruction device may acquire a sample portrait image for which three-dimensional reconstruction of a human head is needed, and the sample portrait image may be a two-dimensional image.

The sample portrait image is similar to the target portrait image in the embodiment shown in FIG. 1, and will not be detailed here.

S220: extracting the two-dimensional feature information from the sample portrait image.

In the embodiment of the present disclosure, after acquiring the sample portrait image, the three-dimensional human head reconstruction device may perform portrait feature analysis on the sample portrait image to extract two-dimensional feature information related to a portrait in the sample portrait image.

The two-dimensional feature information may include human face feature points and a human head contour line.

In some embodiments, S220 may specifically comprise:

extracting, based on a pre-trained human face detection model, human face feature points in the sample portrait image;

extracting, based on a pre-trained human head prediction model, a human head contour line in the sample portrait image.

Specifically, the three-dimensional human head reconstruction device may input the sample portrait image into the pre-trained human face detection model, to perform human face feature point detection on the sample portrait image, to obtain the human face feature points in the sample portrait image output by the human face detection model. The three-dimensional human head reconstruction device may input the sample portrait image into the pre-trained human head prediction model, to perform human head contour detection on the sample portrait image, to obtain the human head contour line in the sample portrait image output by the human head prediction model.

In some other embodiments, S220 may further specifically comprise:

extracting, based on a pre-trained human face detection model, human face feature points in the sample portrait image;

extracting, based on a pre-trained portrait segmentation model, a portrait contour line in the sample portrait image;

taking the human head part in the portrait contour line as the human head contour line.

Specifically, the three-dimensional human head reconstruction device may input the sample portrait image into the pre-trained human face detection model to perform human face feature point detection on the sample portrait image, to obtain the human face feature points in the sample portrait image output by the human face detection model. The three-dimensional human head reconstruction device may input the sample portrait image into the pre-trained portrait segmentation model to perform portrait contour detection on the sample portrait image, to obtain the portrait contour line in the sample portrait image output by the portrait segmentation model, and further determine the human head part in the portrait contour line, and take the human head part in the portrait contour line as the human head contour line.

S230: iteratively fitting the standard three-dimensional human face statistical model based on the two-dimensional feature information to obtain the sample three-dimensional human head model.

In the embodiment of the present disclosure, after extracting the two-dimensional feature information in the sample portrait image, the three-dimensional human head reconstruction device may take the two-dimensional feature information as supervision information, and iteratively fit the standard three-dimensional human face statistical model for a preset number of times based on the two-dimensional feature information, so as to realize the model training of the standard three-dimensional human face statistical model, and accordingly obtain the sample three-dimensional human head model corresponding to the sample portrait image, so that the sample three-dimensional human head model can have the human face features and human head contour features of the portrait in the sample portrait image.

The preset number of times may be any number of times preset on demand, which is not limited here.

Optionally, the standard three-dimensional human face statistical model may include a 3DMM. The standard three-dimensional human face statistical model may be obtained by scanning a plurality of three-dimensional human head models and by the PCA method.

Optionally, the three-dimensional human head reconstruction device may iteratively fit the standard three-dimensional human face statistical model based on the two-dimensional feature information, so as to realize adjustment of the statistical model parameters in the standard three-dimensional human face statistical model, and accordingly obtain the sample statistical model parameters, and to complete the model training of the sample three-dimensional human head model.

Optionally, the model parameters may include an identity coefficient of the portrait in the image, an expression coefficient of the portrait in the image, a posture coefficient of the portrait in the image, a selection coefficient of the portrait in the image, a translation coefficient of the portrait in the image, and projection parameters of a capturing device capturing an image. The projection parameters may be off-camera parameters of the capturing device.

Therefore, in the embodiment of the present disclosure, the 3DMM model of human head can be predicted with the two-dimensional feature information as supervision information, thereby achieving the purpose of reconstructing the three-dimensional human head in real time. Since the two-dimensional feature information for iterative fitting includes the human face feature points and the human head contour line, the three-dimensional reconstruction of the human head of the portrait in the sample portrait image can be realized utilizing the human face features and human head contour features of the portrait in the sample portrait image, so as to reconstruct a three-dimensional human head model that can express both the human face features and the human head contour features, so that the reconstructed three-dimensional human head model can be used to add special effects to the human head of the portrait.

In some embodiments of the present disclosure, in order to improve the reliability of iterative fitting, before S230, the three-dimensional human head reconstruction method may further comprise: plane projecting the standard three-dimensional human face statistical model to obtain projection feature information corresponding to the two-dimensional feature information.

Accordingly, S230 may specifically comprise: iteratively fitting the standard three-dimensional human face statistical model through the third regression loss function based on the two-dimensional feature information and the projection feature information to obtain the sample three-dimensional human head model.

Specifically, after acquiring the sample portrait image, the three-dimensional human head reconstruction device may plane project the standard three-dimensional human face statistical model to obtain projection feature information corresponding to the two-dimensional feature information, and accordingly may utilize the third regression loss function to iteratively fit the standard three-dimensional human face statistical model through a solution optimization algorithm such as a gradient descent or Gauss-Newton method with the two-dimensional feature information as supervision information and the projection feature information as information to be optimized, so as to adjust the statistical model parameters in the standard three-dimensional human face statistical model, and accordingly obtain the sample statistical model parameters, thereby completing the model training of the sample three-dimensional human head model.

In the embodiment of the present disclosure, it should be noted that in the process of iterative fitting, after each fitting, it is necessary to re-plane project the fitted standard three-dimensional human face statistical model to obtain the projection feature information corresponding to the fitted standard three-dimensional human face statistical model, and accordingly continue the next fitting utilizing the two-dimensional feature information and the re-projected projection feature information, until the end of the iterative fitting.

Therefore, in the embodiment of the present disclosure, the standard three-dimensional human face statistical model can be reliably trained utilizing the two-dimensional feature information and the projection feature information, to obtain the sample three-dimensional human head model corresponding to the sample portrait image.

Optionally, before the plane projecting the standard three-dimensional human face statistical model to obtain projection feature information corresponding to the two-dimensional feature information, the three-dimensional human head reconstruction method may further comprise:

detect a human head posture in the sample portrait image.

Accordingly, plane projecting the standard three-dimensional human face statistical model to obtain projection feature information corresponding to the two-dimensional feature information may specifically comprise:

projecting, according to projection parameters of a capturing device for the sample portrait image in the case that the standard three-dimensional human face statistical model is in the human head posture, the standard three-dimensional human face statistical model onto an imaging plane of the capturing device to obtain the projection feature information.

Specifically, after acquiring the sample portrait image, the three-dimensional human head reconstruction device may detect the human head posture of the portrait in the sample portrait image utilizing a pre-trained posture detection model to obtain the human head posture in the sample portrait image, then adjust the posture of the standard three-dimensional human face statistical model, to make the standard three-dimensional human face statistical model in the human head posture, and next acquire the projection parameters of the capturing device for the sample portrait image from the image information of the sample portrait image, and project, according to acquired projection parameters of the capturing device for the sample portrait image in the case that the standard three-dimensional human face statistical model is in the human head posture, the standard three-dimensional human face statistical model onto an imaging plane of the capturing device, to obtain the projection feature information corresponding to the two-dimensional feature information, thereby improving the reliability of plane projection of the standard three-dimensional human face statistical model.

In some embodiments, the projection feature information may include human face projection feature points.

Accordingly, plane projecting the standard three-dimensional human face statistical model to obtain projection feature information corresponding to the two-dimensional feature information may specifically comprise:

projecting respective vertexes of the standard three-dimensional human face statistical model into a two-dimensional space to obtain respective vertex projection points corresponding to the standard three-dimensional human face statistical model;

determining, according to the respective vertex projection points, the human face projection feature points.

Specifically, the three-dimensional human head reconstruction device may first project, according to acquired projection parameters of the capturing device for the sample portrait image in the case that the standard three-dimensional human face statistical model is in the human head posture, respective vertexes of the standard three-dimensional human face statistical model into a two-dimensional space such as the imaging plane of the capturing device, to obtain respective vertex projection points corresponding to the standard three-dimensional human face statistical model, then according to a correspondence between the respective vertexes of a grid to which the respective three-dimensional human face feature points belong and the respective vertex projection points, that is calibrated in the standard three-dimensional human face statistical model in advance, extract the vertex projection points corresponding to the grid to which the respective three-dimensional human face feature points belong, from the respective vertex projection points, and calculate a barycentric projection point corresponding to each grid based on vertex projection points corresponding to each grid, so that the barycentric projection point corresponding to each grid corresponds to the three-dimensional human face feature points to which this grid belongs, and accordingly the calculated respective barycentric projection points are taken as the human face projection feature points corresponding to the respective three-dimensional human face feature points.

In other embodiments, the projection feature information may further include a human head projection contour line.

Accordingly, the plane projecting the standard three-dimensional human face statistical model to obtain projection feature information corresponding to the two-dimensional feature information may specifically comprise: generating, according to the respective vertex projection points, the human head projection contour line corresponding to the standard three-dimensional human face statistical model.

Specifically, the three-dimensional human head reconstruction device may perform image processing on the respective vertex projection points according to a preset contour line generation method, to generate the human head projection contour line corresponding to the standard three-dimensional human face statistical model.

Optionally, the generating, according to the respective vertex projection points, the human head projection contour line corresponding to the standard three-dimensional human face statistical model may specifically comprise:

dilating the respective vertex projection points to obtain a first head region image;

eroding the first head region image to obtain a second head region image;

edge extracting the second head region image to obtain the human head projection contour line.

FIG. 3 shows a flowchart of extraction of a portrait projection contour line provided by an embodiment of the present disclosure.

As shown in FIG. 3, the three-dimensional human head reconstruction device may first project the respective vertexes of the standard three-dimensional human face statistical model into a two-dimensional space to obtain a projection image 301 with the respective vertex projection points, then dilate the respective vertex projection points in the projection image 301 to fill the gaps between the respective vertex projection points to obtain a first head region image 302, next erode the first head region image 302 to eliminate the noise due to dilation to obtain a second head region image 303, and finally, edge extract the second head region image 303 utilizing Canny edge detection algorithm to obtain a contour line projection image 304 with the human head projection contour line.

In the embodiment of the present disclosure, optionally, in the process of simultaneously training the sample three-dimensional human head models corresponding to a plurality of sample portrait images, a process of generating the human head projection contour line according to the respective vertex projection points can be realized utilizing a Graphics Processing Unit (GPU) of the three-dimensional human head reconstruction device, so as to generate human head projection contour lines corresponding to different portrait images in batches, thereby improving the speed of generating human head projection contour lines corresponding to different portrait images.

Therefore, in the embodiment of the present disclosure, with the human face feature points and the human head contour line in the two-dimensional feature information being taken as supervision information respectively, and the human face projection feature points and the human head projection contour line being taken as information to be optimized respectively, according to the correspondence between the human face feature points and the human face projection feature points and the correspondence between the human head contour lines and the human head projection contour lines, the standard three-dimensional human face statistical model can be iteratively fitted utilizing the third regression loss function, to obtain the sample three-dimensional human head model corresponding to the sample portrait image.

Further, in order to improve the efficiency of iterative fitting, before the iteratively fitting the standard three-dimensional human face statistical model based on the two-dimensional feature information to obtain the sample three-dimensional human head model corresponding to the sample portrait image, it is also possible to extract the human head contour feature points from the human head contour line, and to iteratively fit the standard three-dimensional human face statistical model based on the human face feature points and the human head contour feature points to obtain the sample three-dimensional human head model corresponding to the sample portrait image.

In some other embodiments of the present disclosure, the projection feature information may include human face projection feature points and a human head projection contour line.

In these embodiments, before the iteratively fitting, based on the two-dimensional feature information and the projection feature information, the standard three-dimensional human face statistical model through a third regression loss function to obtain the sample three-dimensional human head model, the three-dimensional human head reconstruction method may further comprise:

randomly sampling the human head contour line and the human head projection contour line respectively to obtain human head contour feature points and human head projection contour feature points.

Accordingly, the iteratively fitting, based on the two-dimensional feature information and the projection feature information, the standard three-dimensional human face statistical model through a third regression loss function to obtain the sample three-dimensional human head model may specifically comprise:

iteratively fit, based on the human face feature points, the human head contour feature points, the human face projection feature points and the human head projection contour feature points, the standard three-dimensional human face statistical model through the third regression loss function to obtain the sample three-dimensional human head model corresponding to the sample portrait image.

Specifically, the three-dimensional human head reconstruction device may randomly sample the human head contour line and the human head projection contour line respectively to obtain a preset number of human head contour feature points in the human head contour line and a preset number of human head projection contour feature points in the human head projection contour line, and determine the human head projection contour feature points corresponding to each human head contour feature point according to a minimum distance principle, and accordingly by taking the human face feature points and the human head contour feature points as supervision information respectively and the human face projection feature points and the human head projection contour feature points as information to be optimized respectively, according to the correspondence between the human face feature points and the human face projection feature points and the correspondence between the human head contour feature points and the human head projection contour feature points, iteratively fit the standard three-dimensional human face statistical model utilizing the third regression loss function, to obtain the sample three-dimensional human head model corresponding to the sample portrait image.

Therefore, in the embodiment of the present disclosure, the amount of data computation in the iterative fitting process can be reduced, thereby improving the efficiency of iterative fitting.

In yet some other embodiments of the present disclosure, the two-dimensional feature information may further include shoulder feature points, so that the generated sample three-dimensional human head model corresponding to the sample portrait image can also be used to express neck posture features.

Accordingly, S220 may further specifically comprise:

extracting, based on a pre-trained human body detection model, human body feature points in the sample portrait image;

extracting shoulder feature points from the human body feature points.

Specifically, the three-dimensional human head reconstruction device may input the sample portrait image into the pre-trained human body detection model to perform human body feature point detection on the sample portrait image, to obtain the human body feature points of the portrait in the sample portrait image output by the human body detection model, and accordingly extract the shoulder feature points marked as shoulder features in advance from the human body feature points.

Optionally, a shoulder feature point may be a shoulder joint point of the human body.

In these embodiments, optionally, the projection feature information may further include shoulder projection feature points, which may be matched with the shoulder feature points for iterative fitting to realize the model training.

Accordingly, plane projecting the standard three-dimensional human face statistical model to obtain projection feature information corresponding to the two-dimensional feature information may further specifically comprise:

determining, according to the respective vertex projection points, the shoulder projection feature points.

Specifically, after obtaining the respective vertex projection points corresponding to the standard three-dimensional human face statistical model, the three-dimensional human head reconstruction device may extract, according to a correspondence between the respective vertexes of a grid to which the respective three-dimensional human feature points belong and the respective vertex projection points, that is calibrated in the standard three-dimensional human face statistical model in advance, the vertex projection points corresponding to a grid to which the respective three-dimensional human body feature points corresponding to the clavicle and the upper trapezius muscle part belong, from the respective vertex projection points, and calculate the barycentric projection points corresponding to the respective grids based on the extracted vertex projection points corresponding to the respective grids, so that the barycentric projection point corresponding to a grid to which the clavicle belongs corresponds to the three-dimensional human body feature points of the clavicle, and the barycentric projection point corresponding to a grid to which the upper trapezius muscle part belongs corresponds to the three-dimensional human body feature points of the upper trapezius muscle part, and accordingly take the calculated respective barycentric projection points as the projection feature points corresponding to the three-dimensional human face feature points of the clavicle and the upper trapezius muscle part respectively, and then input the projection feature points corresponding to the clavicle and the upper trapezius muscle part into a preset shoulder feature point calculation formula, to obtain the shoulder projection feature points output by the shoulder feature point calculation formula.

Optionally, a shoulder projection feature point may be a vertex projection point corresponding to a three-dimensional shoulder joint point in the standard three-dimensional human face statistical model.

Optionally, since the 3DMM does not contain shoulder joint point plane information, the mapping relationship between the coordinates of the barycenters of the grids of the clavicle and the upper trapezius muscle part and the three-dimensional coordinates of the calibrated three-dimensional shoulder feature points may be constructed by means of interpolation calculation, and accordingly the shoulder feature point calculation formula is obtained, so that the plane projection of the three-dimensional shoulder feature points is realized through the shoulder feature point calculation formula.

Therefore, in the embodiment of the present disclosure, with the human face feature points, the human head contour line or the human head contour feature points, and the shoulder feature points in the two-dimensional feature information being taken as supervision information respectively, and the human face projection feature points, the human head projection contour line or the human head projection contour feature points, and the shoulder projection feature points being taken as information to be optimized respectively, according to the correspondence between the respective feature points and the contour lines, the standard three-dimensional human face statistical model can be iteratively fitted utilizing the third regression loss function, to obtain the sample three-dimensional human head model, so that the sample three-dimensional human head model corresponding to the sample portrait image can be used to express the human head contour features, the human face features, the human face movements, the human face angles and the neck angles, thereby improving the reliability of the generated sample three-dimensional human head model.

In the following, a three-dimensional human head model fitting process provided by an embodiment of the present disclosure will be described taking FIG. 4 as an example.

Figure 4:
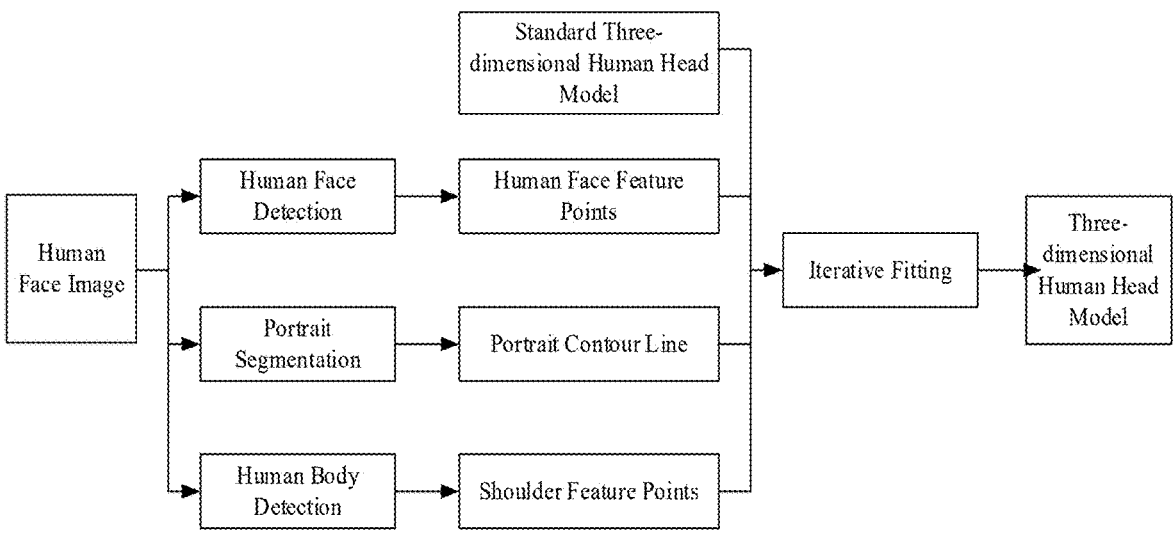
FIG. 4 is a schematic diagram of a three-dimensional human head model fitting process provided by an embodiment of the present disclosure.

FIG. 4 shows a schematic diagram of a three-dimensional human head model fitting process provided by an embodiment of the present disclosure.

As shown in FIG. 4, the three-dimensional human head model fitting process may comprise the following steps.

The three-dimensional human head reconstruction device may acquire a portrait image for which three-dimensional reconstruction of a human head is needed, then extract human face feature points from the portrait image based on a pre-trained human face detection model, extract a human head contour line from the portrait image based on a pre-trained portrait segmentation model and extract shoulder feature points from the portrait image based on a pre-trained human body detection model, and next iteratively fit the standard three-dimensional human face statistical model utilizing the human face feature points, the human head contour line and the shoulder feature points to obtain the three-dimensional human head model corresponding to the portrait image.

Therefore, in the embodiment of the present disclosure, the three-dimensional human head model corresponding to the portrait image can be quickly generated and the statistical model parameters in the three-dimensional human head model corresponding to the portrait image can be acquired.

To sum up, in the embodiments of the present disclosure, the target three-dimensional human head model that can express both the human face features and the human head contour features can be reliably and efficiently generated, and the target three-dimensional human head model can be used to add special effects to the human head of the portrait.

The embodiments of the present disclosure further provide a three-dimensional human head reconstruction apparatus for implementing the three-dimensional human head reconstruction method described above, and will be described below with reference to FIG. 5.

In an embodiment of the present disclosure, the three-dimensional human head reconstruction apparatus may be disposed in a three-dimensional human head reconstruction device, which may be an electronic device or a server, which is not limited here. The Electronic device may include devices with communication functions, such as mobile phones, tablet computers, desktop computers, notebook computers, vehicle-mounted terminals, wearable electronic devices, all-in-one machines, smart home devices and so on, or may also be devices simulated by virtual machines or simulators. The server may include devices with storage and computing functions, such as cloud servers or server clusters.

Figure 5:
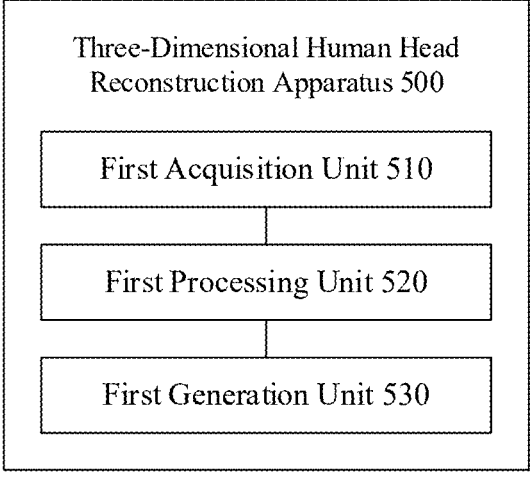
FIG. 5 is a schematic structural diagram of a three-dimensional human head reconstruction apparatus provided by an embodiment of the present disclosure.

FIG. 5 shows a schematic structural diagram of a three-dimensional human head reconstruction apparatus provided by an embodiment of the present disclosure.

As shown in FIG. 5, the three-dimensional human head reconstruction apparatus 500 may include a first acquisition unit 510, a first processing unit 520 and a first generation unit 530.

The first acquisition unit 510 may be configured to acquire a target portrait image.

The first processing unit 520 may be configured to input the target portrait image into a target model to obtain an output result of the target model; the target model is obtained by pre-training with a plurality of training samples which are generated according to a sample portrait image and a sample three-dimensional human head model, the sample three-dimensional human head model is obtained by iteratively fitting a standard three-dimensional human face statistical model according to two-dimensional feature information related to a portrait in the sample portrait image, and the two-dimensional feature information includes human face feature points and a human head projection contour line.

The first generation unit 530 may be configured to generate, according to the output result, a target three-dimensional human head model corresponding to the target portrait image.

The embodiment of the present disclosure can acquire a target portrait image, and input the target portrait image into a pre-trained target model to obtain an output result of the target model, so as to generate a target three-dimensional human head model corresponding to the target portrait image according to the output result. Since the three-dimensional human head model for generating the training samples of the target model is obtained by iteratively fitting a standard three-dimensional human face statistical model according to two-dimensional feature information related to a portrait in a sample portrait image, and the two-dimensional feature information for the iterative fitting includes human face feature points and a human head contour line, so as to enable the three-dimensional human head model for generating the training samples of the target model to express human face features and human head contour features of the portrait in the sample portrait image, and accordingly enable the target model trained based on the training samples to be used to detect information related to the human face features and human head contour features of the portrait. Therefore, the output result of the target model for the target portrait image can be used to express information related to the human face features and human head contour features of the portrait in the target portrait image, so that the target three-dimensional human head model which can express both the human face features and the human head contour features can be generated according to the output result, and the target three-dimensional human head model can be used to add special effects to the human head of the portrait.

In some embodiments of the present disclosure, the training samples may include the sample portrait image and sample statistical model parameters corresponding to the sample three-dimensional human head model, and the output result includes target statistical model parameters.

In some embodiments of the present disclosure, the three-dimensional human head reconstruction apparatus 500 may further include a second acquisition unit, a first training unit and a second training unit.

The second acquisition unit may be configured to acquire a plurality of training samples before acquiring the target portrait image.

The first training unit may be configured to learn a mapping relationship between the sample portrait image and the sample statistical model parameters in each of the training samples through a first regression loss function, to obtain the target model.

The second training unit may be configured to continue to learn the mapping relationship between the sample portrait image and the sample statistical model parameters in each of the training samples through a target loss function, to obtain an optimized target model; the target loss function includes a second regression loss function and a projection loss function, and the weight values of identity coefficients in the second regression loss function is greater than the weight values of identity coefficients in the first regression loss function.

In some embodiments of the present disclosure, the first generation unit 530 may be further configured to generate a target three-dimensional human head model according to the target statistical model parameters and the standard three-dimensional human face statistical model.

In some embodiments of the present disclosure, the three-dimensional human head reconstruction apparatus 500 may further include a third acquisition unit, a first extraction unit and a third training unit.

The third acquisition unit may be configured to acquire a sample portrait image before acquiring the target portrait image.

The first extraction unit may be configured to extract the two-dimensional feature information from the sample portrait image.

The third training unit may be configured to iteratively fit the standard three-dimensional human face statistical model based on the two-dimensional feature information to obtain the sample three-dimensional human head model.

In some embodiments of the present disclosure, the three-dimensional human head reconstruction apparatus 500 may further include a second extraction unit, which may be configured to, before the iteratively fitting the standard three-dimensional human face statistical model based on the two-dimensional feature information to obtain the sample three-dimensional human head model, plane project the standard three-dimensional human face statistical model to obtain projection feature information corresponding to the two-dimensional feature information.

Accordingly, the third training unit may be further configured to iteratively fit the standard three-dimensional human face statistical model through a third regression loss function based on the two-dimensional feature information and the projection feature information, to obtain the sample three-dimensional human head model.

In some embodiments of the present disclosure, the projection feature information may include human face projection feature points.

Accordingly, the second extraction unit may include a first sub-extraction unit and a second sub-extraction unit.

The first sub-extraction unit may be configured to project respective vertexes of the standard three-dimensional human face statistical model into a two-dimensional space to obtain respective vertex projections corresponding to the standard three-dimensional human face statistical model.

The second sub-extraction unit may be configured to determine, according to the respective vertex projection points, the human face projection feature points.

In some embodiment of the present disclosure, the projection feature information may further include a human head projection contour line.

Correspondingly, the second extraction unit may further include a third sub-extraction unit, a fourth sub-extraction unit and a fifth sub-extraction unit.

The third sub-extraction unit may be configured to dilate the respective vertex projection points to obtain a first head region image.

The fourth sub-extracting unit may be configured to erode the first head region image to obtain a second head region image.

The fifth sub-extraction unit may be configured to edge extract the second head region image to obtain the human head projection contour line.

In some embodiments of the present disclosure, the two-dimensional feature information may further include shoulder feature points, and the projection feature information may further include shoulder projection feature points.

Accordingly, the second extraction unit may further include a sixth sub-extraction unit, which may be configured to determine the shoulder projection feature points according to the respective vertex projection points.

In some embodiment of the present disclosure, the projection feature information may include human face projection feature points and a human head projection contour line.

Correspondingly, the three-dimensional human head reconstruction apparatus 500 may further include a random sampling unit, which may be configured to, before the iteratively fitting the standard three-dimensional human face statistical model through a third regression loss function to obtain the sample three-dimensional human head model based on the two-dimensional feature information and the projection feature information, randomly sample the human head contour line and the human head projection contour line respectively to obtain human head contour feature points and human head projection contour feature points.

Accordingly, the third training unit may be further configured to iteratively fit the standard three-dimensional human face statistical model through the third regression loss function to obtain the sample three-dimensional human head model, based on the human face feature points, the human head contour feature points, the human face projection feature points and the human head projection contour feature points.

In some embodiments of the present disclosure, the three-dimensional human head reconstruction apparatus 500 may further include a posture detection unit, which may be configured to detect, before the plane projecting the standard three-dimensional human face statistical model to obtain projection feature information corresponding to the two-dimensional feature information, a human head posture in the sample portrait image.

Accordingly, the second extraction unit may be further configured to project the standard three-dimensional human face statistical model onto an imaging plane of the capturing device to obtain the projection feature information, according to projection parameters of a capturing device for the sample portrait image in the case that the standard three-dimensional human face statistical model is in the human head posture.

It should be noted that the three-dimensional human head reconstruction apparatus 500 shown in FIG. 5 can perform various steps in the method embodiments shown in FIGS. 1 to 2, and realize various processes and effects in the method embodiments shown in FIGS. 1 to 2, which will not be detailed here.

The embodiments of the present disclosure further provide a three-dimensional human head reconstruction device, which may include a processor and a memory. The memory may be used to store executable instructions. The processor may be used to read the executable instructions from the memory and execute the executable instructions to implement the three-dimensional human head reconstruction method in the above embodiments.

Figure 6:
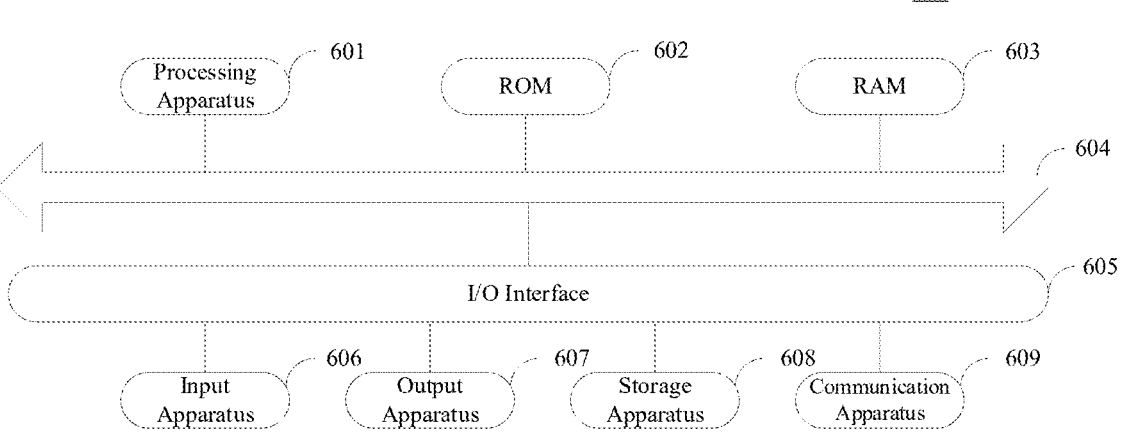
FIG. 6 is a schematic structural diagram of a three-dimensional human head reconstruction device provided by an embodiment of the present disclosure.

FIG. 6 shows a schematic structural diagram of a three-dimensional human head reconstruction device provided by an embodiment of the present disclosure. Reference is made specifically to FIG. 6 below, which shows a schematic structural diagram for implementing a three-dimensional human head reconstruction device 600 in the embodiment of the present disclosure.

In the embodiment of the present disclosure, the three-dimensional human head reconstruction device 600 may be an electronic device or a server, which is not limited here. The electronic device may include devices with communication functions, such as mobile phones, tablet computers, desktop computers, notebook computers, vehicle-mounted terminals, wearable electronic devices, all-in-one machines, smart home devices and so on, or may also be devices simulated by virtual machines or simulators. The server may include devices with storage and computing functions, such as cloud servers or server clusters.

It should be noted that the three-dimensional human head reconstruction device 600 shown in FIG. 6 is merely an example, and should not bring any restrictions on the functions and application scope of the embodiment of the present disclosure.

As illustrated in FIG. 6, the three-dimensional human head reconstruction device 600 may include a processing apparatus (e.g., a central processing unit, a graphics processing unit, etc.) 601, which can perform various suitable actions and processing according to a program stored in a read-only memory (ROM) 602 or a program loaded from a storage apparatus 608 into a random-access memory (RAM) 603. The RAM 603 further stores various programs and data required for operations of the three-dimensional human head reconstruction device 600. The processing apparatus 601, the ROM 602, and the RAM 603 are interconnected by means of a bus 604. An input/output (I/O) interface 605 is also connected to the bus 604.

Usually, the following apparatus may be connected to the I/O interhuman face 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the three-dimensional human head reconstruction device 600 to be in wireless or wired communication with other devices to exchange data. While FIG. 6 illustrates the three-dimensional human head reconstruction device 600 having various apparatuses, it should be understood that not all of the illustrated apparatuses are necessarily implemented or included. More or fewer apparatuses may be implemented or included alternatively.

The embodiments of the present disclosure further provide a computer-readable storage medium having stored a computer program which, when executed by a processor, causes the processor to implement the three-dimensional human head reconstruction method in the above embodiments.

In particular, according to an embodiment of the present disclosure, the process described above with reference to the flowchart may be implemented as a computer software program.

The embodiments of the present disclosure further provides a computer program product containing program instructions. The program instructions, when executed on an electronic device, cause the electronic device to perform the three-dimensional human head reconstruction method in the above embodiments.

For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 609, or installed from the storage apparatus 608, or installed from ROM 602. When the computer program is executed by the processing apparatus 601, the above functions defined in the three-dimensional human head reconstruction method in the embodiments of the present disclosure are executed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the internet (e.g. Internet), and an end-to-end network (e.g., an ad hoc end-to-end network), as well as any network currently known or to be researched and developed in the future.

The above computer-readable medium may be included in the above three-dimensional human head reconstruction device; or it may exist alone without being assembled into the three-dimensional human head reconstruction device.

The above computer-readable medium carries one or more programs which, when executed by the three-dimensional human head reconstruction device, cause the three-dimensional human head reconstruction device to perform the operations as follows:

acquiring a target portrait image; inputting the target portrait image into a target model to obtain an output result of the target model; the target model is obtained by pre-training with a plurality of training samples which are generated according to a sample portrait image and a sample three-dimensional human head model, the sample three-dimensional human head model is obtained by iteratively fitting a standard three-dimensional human face statistical model according to two-dimensional feature information related to a portrait in the sample portrait image, and the two-dimensional feature information includes human face feature points and a human head projection contour line; generating a target three-dimensional human head model corresponding to the target portrait image according to the output result.

In the embodiments of the present disclosure, the computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes they may also be executed in an opposite order, which depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a tangible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, a a portable compact disk read-only medium CD-ROM, an optical storage device, a magnetic storage device, or any suitable combinations of the above.

The above description is only the preferred embodiments of the present disclosure and the illustration of the applied technical principles. It should be understood by those skilled in the art that the disclosed scope involved in the present disclosure is not limited to the technical scheme formed by a specific combination of the above technical features, but also encompasses other technical schemes formed by any combination of the above technical features or their equivalent features without departing from the above disclosed concept, for example, the technical schemes formed by replacing the above features and the technical features with similar functions disclosed in the present disclosure (but not limited thereto) with each other.

Furthermore, although the various operations are depicted in a particular order, this should not be understood as requiring that these operations be performed in the particular order shown or in a sequential order. Under certain circumstances, multitasking and parallel processing may be advantageous. Likewise, although several specific implementation details are contained in the above discussion, these should not be construed as limiting the scope of the present disclosure. Certain features described in the context of separate embodiments can also be implemented in a single embodiment in combination. Rather, various features described in the context of a single embodiment can also be implemented in multiple embodiments individually or in any suitable sub-combination.

Although the subject matter has been described in a language specific to structural features and/or methodological logical actions, it should be understood that the subject matter defined in the appended claims is not necessarily limited to the specific features or actions described above. Rather, the specific features and actions described above are merely example forms of implementing the claims.

The invention claimed is:

1. A three-dimensional human head reconstruction method, comprising:

acquiring a portrait image;

inputting the portrait image into a target model to obtain an output result from the target model, wherein the target model pre-trained with a plurality of training samples which are generated according to a sample portrait image and a sample three-dimensional human head model;

generating, according to the output result, a three-dimensional human head model corresponding to the portrait image;

wherein before acquiring the portrait image, the method further comprises:

acquiring the sample portrait image;

extracting two-dimensional feature information from the sample portrait image;

plane projecting a standard three-dimensional human face statistical model to obtain projection feature information corresponding to the two-dimensional feature information; and iteratively fitting, based on the two-dimensional feature information and the projection feature information, the standard three-dimensional human face statistical model through a regression loss function to obtain the sample three-dimensional human head model.

2. The method according to claim 1, wherein the training samples include the sample portrait image and sample statistical model parameters corresponding to the sample three-dimensional human head model, and the output result includes target statistical model parameters.

3. The method according to claim 2, wherein before acquiring the portrait image, the method further comprises:

acquiring the plurality of training samples;

learning a mapping relationship between the sample portrait image and the sample statistical model parameters in each of the training samples through a first regression loss function, to obtain the target model; and continuing to learn the mapping relationship between the sample portrait image and the sample statistical model parameters in each of the training samples through a target loss function, to obtain an optimized target model; wherein the target loss function includes a second regression loss function and a projection loss function, and weight values of identity coefficients in the second regression loss function are greater than weight values of identity coefficients in the first regression loss function.

4. The method according to claim 2, wherein the generating, according to the output result, the three-dimensional human head model corresponding to the portrait image comprises:

generating the three-dimensional human head model according to the target statistical model parameters and the standard three-dimensional human face statistical model.

5. The method according to claim 1, wherein the projection feature information includes human face projection feature points;

wherein the plane projecting the standard three-dimensional human face statistical model to obtain the projection feature information corresponding to the two-dimensional feature information comprises:

projecting respective vertexes of the standard three-dimensional human face statistical model into a two-dimensional space to obtain respective vertex projection points corresponding to the standard three-dimensional human face statistical model; and determining, according to the respective vertex projection points, the human face projection feature points.

6. The method according to claim 5, wherein the projection feature information further includes a human head projection contour line;

wherein the plane projecting the standard three-dimensional human face statistical model to obtain the projection feature information corresponding to the two-dimensional feature information further comprises:

dilating the respective vertex projection points to obtain a first head region image;

eroding the first head region image to obtain a second head region image; and edge extracting the second head region image to obtain the human head projection contour line.

7. The method according to claim 5, wherein the two-dimensional feature information further includes shoulder feature points, and the projection feature information further includes shoulder projection feature points;

wherein the plane projecting the standard three-dimensional human face statistical model to obtain the projection feature information corresponding to the two-dimensional feature information further comprises:

determining, according to the respective vertex projection points, the shoulder projection feature points.

8. The method according to claim 1, wherein the projection feature information includes human face projection feature points and a human head projection contour line;

wherein before the iteratively fitting, based on the two-dimensional feature information and the projection feature information, the standard three-dimensional human face statistical model through the regression loss function to obtain the sample three-dimensional human head model, the method further comprises:

randomly sampling the human head contour line and the human head projection contour line respectively to obtain human head contour feature points and human head projection contour feature points;

wherein the iteratively fitting, based on the two-dimensional feature information and the projection feature information, the standard three-dimensional human face statistical model through the third regression loss function to obtain the sample three-dimensional human head model comprises:

iteratively fitting the standard three-dimensional human face statistical model through the regression loss function to obtain the sample three-dimensional human head model, based on the human face feature points, the human head contour feature points, the human face projection feature points and the human head projection contour feature points.

9. The method according to claim 1, wherein before the plane projecting the standard three-dimensional human face statistical model to obtain the projection feature information corresponding to the two-dimensional feature information, the method further comprises:

detecting a human head posture in the sample portrait image;

wherein the plane projecting the standard three-dimensional human face statistical model to obtain the projection feature information corresponding to the two-dimensional feature information comprises:

projecting the standard three-dimensional human face statistical model onto an imaging plane of a capturing device to obtain the projection feature information, according to projection parameters of the capturing device for the sample portrait image in the case that the standard three-dimensional human face statistical model is in the human head posture.

10. An electronic device, comprising:

a processor;

a memory for storing executable instructions;

wherein the processor is configured to read the executable instructions from the memory and executing the executable instructions to implement operations comprising:

acquiring a portrait image;

inputting the portrait image into a target model to obtain an output result from the target model, wherein the target model pre-trained with a plurality of training samples which are generated according to a sample portrait image and a sample three-dimensional human head model;

generating, according to the output result, a three-dimensional human head model corresponding to the portrait image;

wherein before acquiring the portrait image, the method further comprises:

acquiring the sample portrait image;

extracting two-dimensional feature information from the sample portrait image, wherein the two-dimensional feature information includes human face feature points and a human head projection contour line;

plane projecting a standard three-dimensional human face statistical model to obtain projection feature information corresponding to the two-dimensional feature information; and iteratively fitting, based on the two-dimensional feature information and the projection feature information, the standard three-dimensional human face statistical model through a regression loss function to obtain the sample three-dimensional human head model.

11. The electronic device according to claim 10, wherein the training samples include the sample portrait image and sample statistical model parameters corresponding to the sample three-dimensional human head model, and the output result includes target statistical model parameters.

12. The electronic device according to claim 11, wherein before acquiring the portrait image, the operations further comprise:

acquiring the plurality of training samples;

learning a mapping relationship between the sample portrait image and the sample statistical model parameters in each of the training samples through a first regression loss function, to obtain the target model; and continuing to learn the mapping relationship between the sample portrait image and the sample statistical model parameters in each of the training samples through a target loss function, to obtain an optimized target model; wherein the target loss function includes a second regression loss function and a projection loss function, and weight values of identity coefficients in the second regression loss function are greater than weight values of identity coefficients in the first regression loss function.

13. The electronic device according to claim 11, wherein the generating, according to the output result, the three-dimensional human head model corresponding to the portrait image comprises:

generating the three-dimensional human head model according to the target statistical model parameters and the standard three-dimensional human face statistical model.

14. The electronic device according to claim 10, wherein the projection feature information includes human face projection feature points, and wherein the plane projecting the standard three-dimensional human face statistical model to obtain the projection feature information corresponding to the two-dimensional feature information comprises:

projecting respective vertexes of the standard three-dimensional human face statistical model into a two-dimensional space to obtain respective vertex projection points corresponding to the standard three-dimensional human face statistical model; and determining, according to the respective vertex projection points, the human face projection feature points.

15. The electronic device according to claim 10, wherein the projection feature information includes human face projection feature points and a human head projection contour line;

wherein before iteratively fitting, based on the two-dimensional feature information and the projection feature information, the standard three-dimensional human face statistical model through the regression loss function to obtain the sample three-dimensional human head model, the operations further comprise randomly sampling the human head contour line and the human head projection contour line respectively to obtain human head contour feature points and human head projection contour feature points; and wherein the iteratively fitting, based on the two-dimensional feature information and the projection feature information, the standard three-dimensional human face statistical model through the regression loss function to obtain the sample three-dimensional human head model comprises iteratively fitting the standard three-dimensional human face statistical model through the regression loss function to obtain the sample three-dimensional human head model, based on the human face feature points, the human head contour feature points, the human face projection feature points and the human head projection contour feature points.

16. The electronic device according to claim 10, wherein before the plane projecting the standard three-dimensional human face statistical model to obtain the projection feature information corresponding to the two-dimensional feature information, the operations further comprise detecting a human head posture in the sample portrait image; and wherein the plane projecting the standard three-dimensional human face statistical model to obtain the projection feature information corresponding to the two-dimensional feature information comprises projecting the standard three-dimensional human face statistical model onto an imaging plane of a capturing device to obtain the projection feature information according to projection parameters of the capturing device for the sample portrait image in response to determining that the standard three-dimensional human face statistical model is in the human head posture.

17. A non-transitory computer-readable storage medium having stored computer programs which, when executed by a processor, cause the processor to implement operations comprising:

acquiring a portrait image;

inputting the portrait image into a target model to obtain an output result from the target model, wherein the target model pre-trained with a plurality of training samples which are generated according to a sample portrait image and a sample three-dimensional human head model;

generating, according to the output result, a three-dimensional human head model corresponding to the portrait image;

wherein before acquiring the portrait image, the method further comprises:

acquiring the sample portrait image;

extracting two-dimensional feature information from the sample portrait image, wherein the two-dimensional feature information includes human face feature points and a human head projection contour line;

plane projecting a standard three-dimensional human face statistical model to obtain projection feature information corresponding to the two-dimensional feature information; and iteratively fitting, based on the two-dimensional feature information and the projection feature information, the standard three-dimensional human face statistical model through a regression loss function to obtain the sample three-dimensional human head model.

18. The non-transitory computer-readable storage medium according to claim 17, wherein the training samples include the sample portrait image and sample statistical model parameters corresponding to the sample three-dimensional human head model, and the output result includes target statistical model parameters.

19. The non-transitory computer-readable storage medium according to claim 18, wherein before acquiring the portrait image, the operations further comprise:

acquiring the plurality of training samples;

learning a mapping relationship between the sample portrait image and the sample statistical model parameters in each of the training samples through a first regression loss function, to obtain the target model; and continuing to learn the mapping relationship between the sample portrait image and the sample statistical model parameters in each of the training samples through a target loss function, to obtain an optimized target model; wherein the target loss function includes a second regression loss function and a projection loss function, and weight values of identity coefficients in the second regression loss function are greater than weight values of identity coefficients in the first regression loss function.

20. The non-transitory computer-readable storage medium according to claim 18, wherein the generating, according to the output result, the three-dimensional human head model corresponding to the portrait image comprises:

generating the three-dimensional human head model according to the target statistical model parameters and the standard three-dimensional human face statistical model.

* * * * *